United States Patent
Ming

(10) Patent No.: US 8,050,493 B2
(45) Date of Patent: Nov. 1, 2011

(54) METHOD FOR GENERATING A HIGH QUALITY SCANNED IMAGE OF A DOCUMENT

(75) Inventor: Wei Ming, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 819 days.

(21) Appl. No.: 12/058,942

(22) Filed: Mar. 31, 2008

(65) Prior Publication Data

US 2009/0245678 A1 Oct. 1, 2009

(51) Int. Cl.
*G06K 9/00* (2006.01)
(52) U.S. Cl. .................... 382/154; 382/278; 382/282
(58) Field of Classification Search .......... 382/154, 382/278, 282, 274, 375, 289, 295; 358/3.26, 358/3.27, 436, 452
See application file for complete search history.

(56) References Cited

U.S. PATENT DOCUMENTS

| | | | |
|---|---|---|---|
| 6,670,954 B2 * | 12/2003 | Arai et al. ................... 345/420 |
| 6,975,418 B1 * | 12/2005 | Ohta et al. .................. 358/1.15 |
| 6,982,811 B2 * | 1/2006 | Sato .............................. 358/1.4 |
| 7,027,054 B1 * | 4/2006 | Cheiky et al. ................ 345/473 |
| 7,027,662 B2 * | 4/2006 | Baron ........................... 382/275 |
| 7,184,814 B2 * | 2/2007 | Lang et al. .................... 600/416 |
| 7,287,253 B2 * | 10/2007 | Yamamura et al. ........... 717/176 |
| 7,359,535 B2 * | 4/2008 | Salla et al. .................... 382/128 |

OTHER PUBLICATIONS

"Understanding Dilation and Erosion :: Morphological Operations (Image Processing Toolbox)", The Mathworks, Inc., http://www.mathworks.com/access/helpdesk_r13/help/toolbox/images/morph4.html, 2 pages, printed from the Internet on Mar. 24, 2008.

* cited by examiner

*Primary Examiner* — Yosef Kassa
(74) *Attorney, Agent, or Firm* — Chen Yoshimura LLP

(57) ABSTRACT

An improved image processing method for generating an image from a hard copy document includes the following steps: scanning the hard copy document multiple times using a scanner to generate a plurality of images; performing deskewing for each image; performing translational compensation for each image; selecting two images (first and second) among the plurality of images that have the highest similarity to each other; dilating the first image; converting the dilated first image into a binary form; eroding the converted first image to generate a first processed image; eroding the second image; converting the eroded second image into a binary form; dilating the converted second image to generate a second processed image; and extracting common portions of the first and second processed images to generate a final image. This method can be used to generate high quality scanned images of hard copy documents for purposes of document authentication.

18 Claims, 2 Drawing Sheets

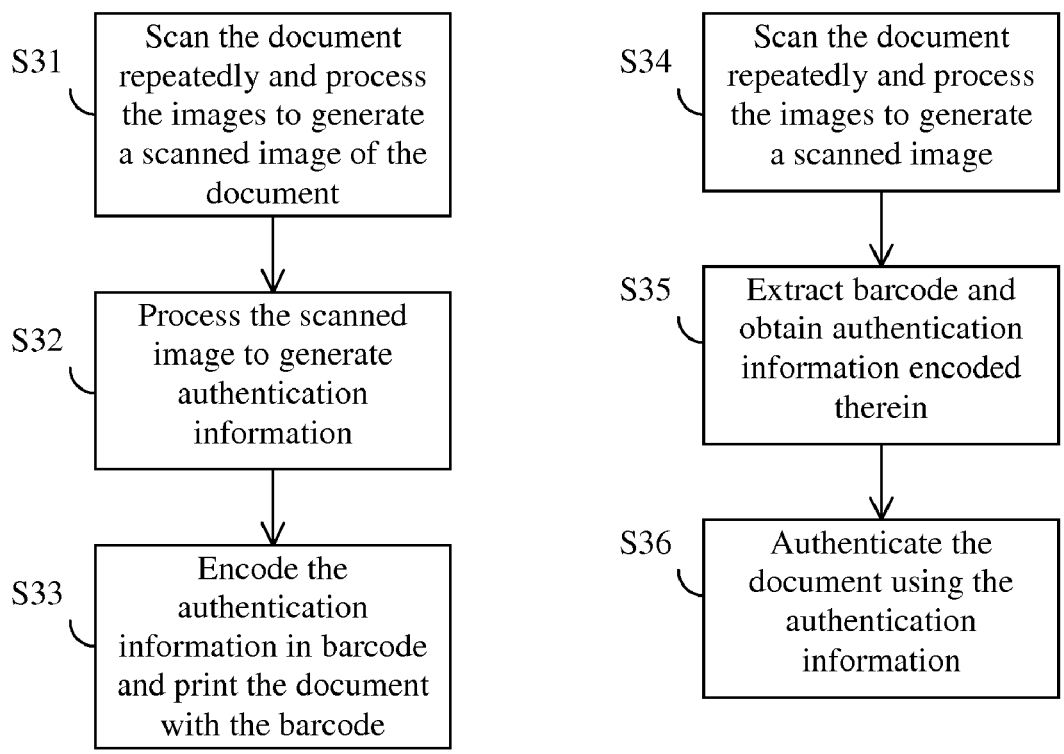
Fig. 2A
Fig. 2B
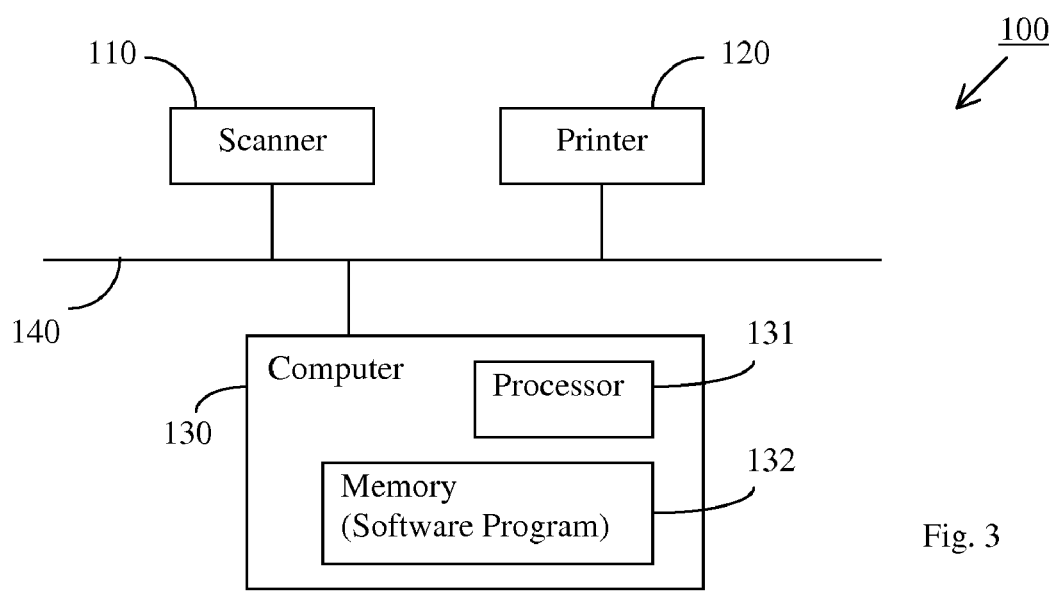
Fig. 3

METHOD FOR GENERATING A HIGH QUALITY SCANNED IMAGE OF A DOCUMENT

BACKGROUND OF THE INVENTION

1. Field of the Invention

This invention relates to image processing, and in particular, it relates to a method for improving the quality of a scanned image of a document.

2. Description of Related Art

As information is increasingly being transmitted and consumed in digital forms, it is becoming an increasingly common practice to convert hard copies of documents into digital images using scanners. The scanning process, however, often introduces image distortions such as image shift and skew as well as random noises in the scanned image. Problems with such distortions and noises are present even for high-end scanners. Such distortions and noises adversely affect the appearance of the scanned image. Moreover, when the scanned image is subject to further digital processing such as document authentication, the distortions and noises introduced in the scanning process often impair such processing.

Document authentication refers to a process by which a printed document, which has been distributed and circulated in its hard copy form, and may have been photocopied, is examined to determine whether its content has been altered since it was first printed. Some authentication techniques can determine what the alterations are. Alteration may occur as a result of accidental events or deliberate effort. In one form of document authentication, information regarding the content of the document is associated with the document itself. For example, such information may be encoded in two-dimensional barcode printed on the document itself or on the backside of the document. When the hard copy of a document is scanned back, the barcode is read and the data encoded in the barcode is extracted. The scanned document is analyzed using the information extracted from the barcode to determine whether the document is authentic (i.e. whether alterations have been made, or what the alterations are). In another form of document authentication, information regarding the document is stored in digital form in a reference database, and scanned document is analyzed using the information stored in the database to determine its authenticity.

SUMMARY

The present invention is directed to a method for improving the image quality of a scanned image of a document that substantially obviates one or more of the problems due to limitations and disadvantages of the related art.

An object of the present invention is to provide a method for generating high quality scanned images from hard copy documents.

Another object of the present invention is to provide an improved method for document authentication.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides an image processing method for generating an image from a hard copy document, which includes: (a) scanning the hard copy document multiple times using a scanner to generate a plurality of images; (b) performing deskewing for each image; (c) performing translational compensation for each image; (d) selecting two images among the plurality of images that have the highest similarity to each other, the two selected images including a first image and a second image; (e) dilating the first image; (f) converting the dilated first image into a binary form; (g) eroding the converted first image to generate a first processed image; (h) eroding the second image; (i) converting the eroded second image into a binary form; (j) dilating the converted second image to generate a second processed image; (k) extracting common portions of the first and second processed images to generate a final image; and (l) storing the final image.

In another aspect, the present invention provides a method for generating a self-authenticating printed document from a hard copy document, which includes: generating a final image from the hard copy document using the above method; generating document authentication information based on the final image; encoding the document authentication information in barcode; and printing the image with the barcode associated therewith.

The present invention also provides a method for authenticating a printed document that contains barcode encoding document authentication information, which includes: generating a final image from the printed document using the above method; extracting the barcode from the final image and obtaining the document authentication information encoded therein; and authenticating the document using the document authentication information.

In another aspect, the present invention provides a computer program product that causes a data processing apparatus to perform the above methods.

It is to be understood that both the foregoing general description and the following detailed description are exemplary and explanatory and are intended to provide further explanation of the invention as claimed.

BRIEF DESCRIPTION OF THE DRAWINGS

FIGS. 2A and 2B illustrate a document authentication process using the image processing method of FIG. 1.

FIG. 3 schematically illustrates a data processing system in which embodiments of the present invention may be implemented.

DETAILED DESCRIPTION OF PREFERRED EMBODIMENTS

Figure 1:
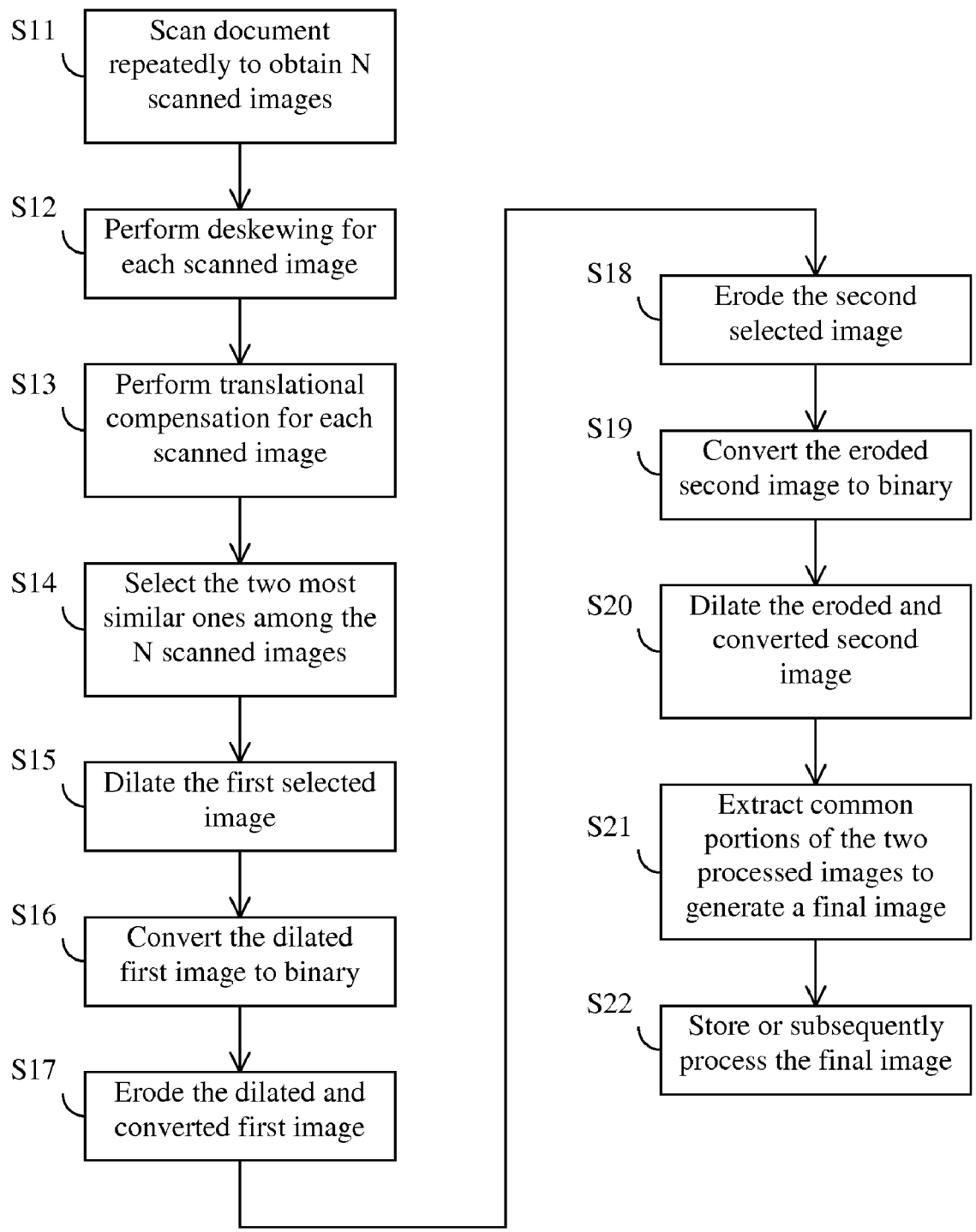
FIG. 1 illustrates an image processing method according to an embodiment of the present invention.

Methods according to embodiments of the present invention employ various digital image processing techniques to generate high quality images for scanned documents. Referring to FIG. 1, the hard copy document to be digitized is scanned multiple times to obtain N scanned images (step S11), each image being a grayscale bitmap image. In one particular example, N is 3. Typically, each scanned image will contain certain amount of skew, and the images will also contain translational shifts relative to each other. In addition, random noises will typically be present in each image. Deskewing is performed for each scanned image (step S12). Deskewing may be accomplished by detecting paper edges in an image, as image areas corresponding to the paper typically has a grayscale value different from the image areas where no paper was present, allowing paper edges to be detected. Alternatively, if the hard copy document contains markers, such as crosshair markers in the corners, the markers can be used to perform deskewing. Translational compensation is then performed for the scanned images (step S13). In this step, one of the multiple images is used as a reference and the other images are shifted to match the reference image.

Next, two images that are the most similar to each other are selected among the multiple images (step S14). This step may be implemented in a number of ways. In a first implementation, a pixel-wise correlation is calculated for each pair of images, and the pair of images with the highest correlation value is selected. In another implementation, a pixel-wise subtraction is performed to calculate a difference image for each pair of images. The difference image is subject to further processing (optional), such as grouping of pixels, and a difference value is calculated. The pair of images with the lowest difference value is selected.

The subsequent processing steps are performed the two selected images. For the first selected image, a dilation process is performed first (step S15), the dilated image is converted to a binary image (step S16), and an erosion process is performed on the dilated and converted first image (step S17). For the second selected image, an erosion process is performed first (step S18), the eroded image is converted to a binary image (step S19), and a dilation process is performed on the eroded and converted second image (step S20). Dilation and erosion are well-known techniques in morphological image processing. Dilation generally results in an expansion of the dark areas of the image, while erosion generally results in a contracting of the dark areas of the image. A general discussion of dilation and erosion may be found, for example, in an article entitled "Understanding Dilation and Erosion: Morphological Operations (Image Processing Toolbox)", available on the Internet at http://www.mathworks.com/access/helpdesk_r13/help/toolbox/images/morph4.html. There are many variations of dilation and erosion algorithms for grayscale images; any suitable algorithms may be used to implement the above steps. In addition, region growing and image shrinking algorithms may also be used. In this disclosure and the appended claims, the term dilation is broadly used to include region growing, and the term erosion is used broadly to include image shrinking.

The first processed image (the resulting image of steps S15 to S17) and the second processed image (the resulting image of steps S18 to S20) and processed to extract the common portions of the image (step S21). This may be done by a pixel-wise AND operation. The final image resulting from step S21 can be stored or used in subsequent processing as the scanned image of the document (step S22).

The final image generated by the process of FIG. 1 generally has lower random noise levels and reduced density variation, and is cleaner and smoother.

FIGS. 2A and 2B illustrates an example of a process in which the scanned image of a document generated by the method of FIG. 1 is used in a document authentication application. FIG. 2A illustrates the process for generating a printed document bearing barcode that contains document authentication information (often referred to as a self-authenticating document). First, a hard copy document is scanned multiple times and the scanned images are processed using the process shown in FIG. 1 to generate a scanned image of the document (step S31). The scanned image is processed to generate document authentication information (step S32). The implementation of this step and the document authentication information generated thereby depends on the particular authentication algorithm used. Various authentication algorithms are known, and detailed descriptions are omitted here. The document authentication information is encoded in two-dimensional barcode, and the document is printed with the barcode (step S33). The barcode can be printed on the front side of the document, on the backside of the document, or on a separate sheet to be associated with the document. The printed document can then be distributed for its intended use.

To determine the authenticity of a document that bears document authentication information, as illustrated in FIG. 2B, the document is scanned multiple times and the scanned images are processed using the process shown in FIG. 1 to generate a scanned image of the document (step S34). The barcode is extracted and the document authentication information encoded therein is obtained (step S35). The document authentication information is used to determine the authenticity of the document (step S36). The implementation of the authentication step S36 again depends on the authentication algorithm used.

In the authentication process of FIGS. 2A and 2B, by using the process of FIG. 1 to generate the scanned image of the documents in steps S31 and S34, authentication can be achieved more reliably. It can reduce instances of false identifying of alternations, which may be caused by image shift, density variation and noise.

In the document authentication example described above, the process of generating a self-authenticating document (FIG. 2A) and the process of authenticating a self-authenticating document (FIG. 2B) may be and often are performed independently by parties not related to each other. While it is more preferable that both the generating process and the authenticating process use the method of FIG. 1 to process the scanned images in steps S31 and S34, the method can be practiced when the process of FIG. 1 is only used in step S31 (while step S34 is a conventional scanning process using a single scan) or when the process of FIG. 1 is only used in step S34 (while step S31 is a conventional scanning process using a single scan).

Although grayscale images are used in the above descriptions as an example, color images can also be processed. Steps S15 through S21 are performed for each of the R, G, and B components separately. In steps S12 and S13, the amount of skew and translational shift may be calculated using one of the three color components, or by taking averages of the skew and shift amounts calculated from each color component. In step S14, the correlations or differences are calculated separately for the R, G, and B components first. Then the two most similar images are chosen according to the average and deviation of correlations or differences of the R, G, and B components. Alternatively, one of the color components may be used to select the two most similar images.

The methods described above can be implemented in a data processing system which includes a computer and a printer, scanner and/or all-in-one multifunction machine connected to the computer. The typical structure of the data processing system is shown in FIG. 3. The data processing system 100 includes a scanner 110, a printer 120, and a computer 130 connected each other via a network 140. Alternatively, the scanner 110 and/or the printer 120 may be an all-in-one machine, which is a device that combines printing, scanning and copying functions. The computer 130 comprises a processor 131 and a memory device 132 such as a hard disk drive storing software programs. The processor 131 executes the software programs in the memory device 132 to carry out the methods described above. In this typical example, the computer 130 received image data generated by the scanner 110, and processes the image data according to the method of FIGS. 1, 2A and 2B. Of course, the computer that carries out the process of FIG. 2A to generate a self-authenticating document and the computer that carries out the process of FIG. 2B to authenticate a printed document need not be the same computer. Alternately, the software programs can be stored in memories in the scanner 110 and/or the printer 120, and can be executed by the respective processors in the scanner 110 and/or the printer 120.

It will be apparent to those skilled in the art that various modification and variations can be made in the image processing method and apparatus of the present invention without departing from the spirit or scope of the invention. Thus, it is intended that the present invention cover modifications and variations that come within the scope of the appended claims and their equivalents.

What is claimed is:

1. An image processing method for generating an image from a hard copy document, comprising:
   (a) scanning the hard copy document multiple times using a scanner to generate a plurality of images;
   (b) performing deskewing for each image;
   (c) performing translational compensation for each image;
   (d) selecting two images among the plurality of images that have the highest similarity to each other, the two selected images including a first image and a second image;
   (e) dilating the first image;
   (f) converting the dilated first image into a binary form;
   (g) eroding the converted first image to generate a first processed image;
   (h) eroding the second image;
   (i) converting the eroded second image into a binary form;
   (j) dilating the converted second image to generate a second processed image;
   (k) extracting common portions of the first and second processed images to generate a final image; and
   (l) storing the final image.

2. The method of claim 1, wherein step (b) is performed for each image by detecting a paper edge in the image.

3. The method of claim 1, wherein step (c) is performed by setting one of the plurality of images as a reference image and shifting other ones of the plurality of images with respect to the reference image.

4. The method of claim 1, wherein step (d) comprises:
   (d1) for each pair of images, calculating a pixel-wise correlation value; and
   (d2) selecting a pair of images having a highest correlation value.

5. The method of claim 1, wherein step (d) comprises:
   (d1) for each pair of images, calculating a difference image by pixel-wise subtraction and calculating a difference value from the difference image; and
   (d2) selecting a pair of images having a lowest difference value.

6. The method of claim 1, wherein each image generated in step (a) is a grayscale image.

7. The method of claim 1, wherein each image generated in step (a) is a color image including a set of color components, and wherein steps (e) through (k) are performed separately for each color component.

8. The method of claim 1, further comprising:
   generating document authentication information based on the final image;
   encoding the document authentication information in barcode; and
   printing the image with the barcode associated therewith.

9. The method of claim 1, wherein the hard copy document contains barcode encoding document authentication information, the method further comprising:
   extracting the barcode from the final image and obtaining the document authentication information encoded therein; and
   authenticating the document using the document authentication information.

10. A non-transitory compute readable medium having a computer readable code embodied therein for controlling a data processing apparatus, the computer readable program code comprising code configured to cause the data processing apparatus to execute an image processing method comprising the steps of:
    (a) receiving a plurality of images, each image having been generated by scanning the hard copy document using a scanner;
    (b) performing deskewing for each image;
    (c) performing translational compensation for each image;
    (d) selecting two images among the plurality of images that have the highest similarity to each other, the two selected images including a first image and a second image;
    (e) dilating the first image;
    (f) converting the dilated first image into a binary form;
    (g) eroding the converted first image to generate a first processed image;
    (h) eroding the second image;
    (i) converting the eroded second image into a binary form;
    (j) dilating the converted second image to generate a second processed image;
    (k) extracting common portions of the first and second processed images to generate a final image; and
    (l) storing the final image.

11. The non-transitory compute readable medium of claim 10, wherein step (b) is performed for each image by detecting a paper edge in the image.

12. The non-transitory compute readable medium of claim 10, wherein step (c) is performed by setting one of the plurality of images as a reference image and shifting other ones of the plurality of images with respect to the reference image.

13. The non-transitory compute readable medium of claim 10, wherein step (d) comprises:
    (d1) for each pair of images, calculating a pixel-wise correlation value; and
    (d2) selecting a pair of images having a highest correlation value.

14. The non-transitory compute readable medium of claim 10, wherein step (d) comprises:
    (d1) for each pair of images, calculating a difference image by pixel-wise subtraction and calculating a difference value from the difference image; and
    (d2) selecting a pair of images having a lowest difference value.

15. The non-transitory compute readable medium of claim 10, wherein each image generated in step (a) is a grayscale image.

16. The non-transitory compute readable medium of claim 10, wherein each image generated in step (a) is a color image including a set of color components, and wherein steps (e) through (k) are performed separately for each color component.

17. The non-transitory compute readable medium of claim 10, wherein the image processing method further comprises:
  generating document authentication information based on the final image;
  encoding the document authentication information in barcode; and
  associating the barcode with the final image.

18. The non-transitory compute readable medium of claim 10, wherein the hard copy document contains barcode encoding document authentication information, the method further comprising:
  extracting the barcode from the final image and obtaining the document authentication information encoded therein; and
  authenticating the printed document using the document authentication information.

* * * * *